(12) United States Patent
Louie et al.

(10) Patent No.: US 12,436,595 B2
(45) Date of Patent: Oct. 7, 2025

(54) DISTRIBUTED THERMAL MANAGEMENT ARCHITECTURE

(71) Applicant: QUALCOMM Incorporated, San Diego, CA (US)

(72) Inventors: Louis Louie, San Diego, CA (US); Ronald Alton, Oceanside, CA (US); Sumarlin William, San Diego, CA (US); Vinayak Nana Mehetre, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 18/452,880

(22) Filed: Aug. 21, 2023

(65) Prior Publication Data

US 2025/0068227 A1    Feb. 27, 2025

(51) Int. Cl.
*G06F 1/32*      (2019.01)
*G06F 1/20*      (2006.01)
*G06F 1/3206*    (2019.01)
*G06F 1/3287*    (2019.01)

(52) U.S. Cl.
CPC ............ *G06F 1/3287* (2013.01); *G06F 1/206* (2013.01); *G06F 1/3206* (2013.01)

(58) Field of Classification Search
CPC ....... G06F 1/3287; G06F 1/3206; G06F 1/206
See application file for complete search history.

(56) References Cited

U.S. PATENT DOCUMENTS

| | | |
|---|---|---|
| 11,231,760 B1 * | 1/2022 | Gu .......................... G06F 1/206 |
| 2010/0254058 A1 | 10/2010 | Kirchbaum et al. |
| 2017/0038805 A1 | 2/2017 | Chun |
| 2018/0341302 A1 | 11/2018 | Shabbir et al. |
| 2021/0149476 A1 | 5/2021 | Alton et al. |

FOREIGN PATENT DOCUMENTS

EP         1655655 A2    5/2006

OTHER PUBLICATIONS

International Search Report and Written Opinion—PCT/US2024/038193—ISA/EPO—Oct. 24, 2024.

* cited by examiner

*Primary Examiner* — Stefan Stoynov
(74) *Attorney, Agent, or Firm* — Loza & Loza LLP

(57) ABSTRACT

Thermal management aspects include a serial databus; a central processing unit (CPU); a graphics processing unit (GPU); a neural signal processor (NSP); an always on subsystem (AOSS); the serial databus, the CPU, the GPU, the NSP and the AOSS are implemented on a system on a chip; wherein the CPU includes a first plurality of thermal sensors and a first plurality of controllers, each of the first plurality of thermal sensors is coupled to each of the first plurality of controllers; wherein the NSP includes a second plurality of thermal sensors and a second plurality of controllers, each of the second plurality of thermal sensors is coupled to each of the second plurality of controllers; and wherein the AOSS includes a third plurality of thermal sensors and a third plurality of controllers, each of the third plurality of thermal sensors is coupled to each of the third plurality of controllers.

20 Claims, 7 Drawing Sheets

DISTRIBUTED THERMAL MANAGEMENT ARCHITECTURE

TECHNICAL FIELD

This disclosure relates generally to the field of thermal management, and, in particular, to distributed thermal management architecture.

BACKGROUND

Every electronic system requires thermal management of some type for proper operation. Some of the electrical energy supplied to an electronic system is unavoidably converted into thermal energy. The thermal energy modifies temperature gradients in the electronic system and its ambient environment. Therefore, an efficient thermal management architecture is needed for optimal performance.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a distributed thermal management architecture. Accordingly, an apparatus for implementing thermal management, the apparatus including a serial databus; a central processing unit (CPU) coupled to the serial databus; a graphics processing unit (GPU) coupled to the serial databus; a neural signal processor (NSP) coupled to the serial databus; an always on subsystem (AOSS) coupled to the serial databus; wherein the serial databus, the CPU, the GPU, the NSP and the AOSS are implemented on a system on a chip (SOC); wherein the CPU includes a first plurality of thermal sensors and a first plurality of controllers, and each of the first plurality of thermal sensors is coupled to each of the first plurality of controllers; wherein the GPU includes a second plurality of thermal sensors and a second plurality of controllers, and each of the second plurality of thermal sensors is coupled to each of the second plurality of controllers; wherein the NSP includes a third plurality of thermal sensors and a third plurality of controllers, and each of the third plurality of thermal sensors is coupled to each of the third plurality of controllers; and wherein the AOSS includes a fourth plurality of thermal sensors and a fourth plurality of controllers, and each of the fourth plurality of thermal sensors is coupled to each of the fourth plurality of controllers.

In one example, the CPU further includes a first plurality of central broadcast (CB) units, wherein each of the first plurality of CB units is coupled to the each of the first plurality of controllers. In one example, each of the first plurality of controllers is configured to generate a digitized temperature data based on a thermal data received from the each of the first plurality of thermal sensors. In one example, the apparatus further includes a first plurality of local limit management (LLM) units, wherein each of the first plurality of LLM units is coupled to the each of the first plurality of CB units, and wherein each of the first plurality of LLM units is configured to execute a thermal management procedure based on whether the digitized temperature data has exceeded a predetermined thermal limit.

In one example, the apparatus further includes a second plurality of central broadcast (CB) units, wherein each of the second plurality of CB units is coupled to the each of the second plurality of controllers. In one example, each of the second plurality of controllers is configured to generate a digitized temperature data based on a thermal data received from the each of the second plurality of thermal sensors. In one example, the apparatus further includes a graphics management unit (GMU), wherein the GMU is coupled to the each of the second plurality of CB units, and wherein the GMU is configured to execute a thermal management procedure based on whether the digitized temperature data has exceeded a predetermined thermal limit.

In one example, the NSP further includes a third plurality of central broadcast (CB) units, wherein each of the third plurality of CB units is coupled to the each of the third plurality of controllers. In one example, each of the third plurality of controllers is configured to generate digitized temperature data based on thermal data received from the each of the third plurality of thermal sensors. In one example, the apparatus further includes a second plurality of local limit management (LLM) units, wherein each of the second plurality of LLM units is coupled to the each of the third plurality of CB units, and wherein each of the second plurality of LLM units is configured to execute a thermal management procedure based on whether the digitized temperature data has exceeded a predetermined thermal limit.

In one example, the AOSS further includes a fourth plurality of central broadcast (CB) units, wherein each of the fourth plurality of CB units is coupled to the each of the fourth plurality of controllers. In one example, each of the fourth plurality of controllers is configured to generate digitized temperature data based on thermal data received from the each of the fourth plurality of thermal sensors.

In one example, the apparatus further includes an audio processor coupled to the serial databus; a camera processor coupled to the serial databus; a computer vision processor coupled to the serial databus; a video processor coupled to the serial databus; a RDMA over Converged Ethernet (RoCE) processor coupled to the serial databus; and a double data rate (DDR) memory controller unit coupled to the serial databus, wherein one or more of the fourth plurality of thermal sensors is configured to measure the temperature of the audio, camera, computer vision, video, RoCE processors; and wherein one or more of the fourth plurality of thermal sensors is configured to measure the temperature of the DDR memory controller unit.

Another aspect of the disclosure provides a method for implementing thermal management, the method including: sensing a first ambient temperature using a first thermal sensor at a first subsystem location within a system on a chip (SOC); transducing the first ambient temperature into a first telemetry signal; sensing a second ambient temperature using a second thermal sensor at a second subsystem location with the SOC; transducing the second ambient temperature into a second telemetry signal; and receiving the first telemetry signal from the first thermal sensor and the second telemetry signal from the second thermal sensor at a thermal management controller.

In one example, the first telemetry signal is monotonically related to the first ambient temperature. In one example, the first telemetry signal is linearly related to the first ambient temperature. In one example, the first subsystem location and the second subsystem location are in a same subsystem of a plurality of subsystems of the SOC.

In one example, the method further includes transforming the first telemetry signal into a first digital code and the second telemetry signal into a second digital code at the thermal management controller. In one example, the method further includes relaying the first digital code and the second digital code to a central broadcast (CB) unit to produce a first broadcast message and a second broadcast message. In one example, the first digital code is a proportional representation of the first ambient temperature. In one example, the first digital code is a nonlinear representation of the first ambient temperature.

In one example, the first digital code is an uncompressed quantized version of the first ambient temperature and the second digital code is an uncompressed quantized version of the second ambient temperature. In one example, the first digital code is a compressed quantized version of the first ambient temperature and the second digital code is a compressed quantized version of the second ambient temperature.

In one example, the method further includes sending the first broadcast message and the second broadcast message to a local limit management unit to execute local thermal management for the first subsystem location and the second subsystem location. In one example, the local thermal management is independent of a centralized thermal management system for the SOC and the local limit management unit is configured to accept auxiliary data from the centralized thermal management system for the execution of the local thermal management.

Another aspect of the disclosure provides an apparatus for implementing thermal management, the apparatus including: means for sensing a first ambient temperature using a first thermal sensor at a first subsystem location within a system on a chip (SOC); means for transducing the first ambient temperature into a first telemetry signal; means for sensing a second ambient temperature using a second thermal sensor at a second subsystem location with the SOC; means for transducing the second ambient temperature into a second telemetry signal; and means for receiving the first telemetry signal from the first thermal sensor and the second telemetry signal from the second thermal sensor at a thermal management controller.

In one example, the apparatus further includes: means for transforming the first telemetry signal into a first digital code and the second telemetry signal into a second digital code at the thermal management controller; means for relaying the first digital code and the second digital code to a central broadcast (CB) unit to produce a first broadcast message and a second broadcast message; and means for sending the first broadcast message and the second broadcast message to a local limit management unit to execute local thermal management for the first subsystem location and the second subsystem location.

In one example, the apparatus further includes: means for accepting auxiliary data from a centralized thermal management system for the execution of the local thermal management, and wherein the local thermal management is independent of the centralized thermal management system for the SOC and the local limit management unit is configured to execute a thermal management procedure based on whether a digitized temperature data has exceeded a predetermined thermal limit.

Another aspect of the disclosure provides a non-transitory computer-readable medium storing computer executable code, operable on a device including at least one processor and at least one memory coupled to the at least one processor, wherein the at least one processor is configured to implement thermal management, the computer executable code including: instructions for causing a computer to sense a first ambient temperature using a first thermal sensor at a first subsystem location within a system on a chip (SOC); instructions for causing the computer to transduce the first ambient temperature into a first telemetry signal; instructions for causing the computer to sense a second ambient temperature using a second thermal sensor at a second subsystem location with the SOC; instructions for causing the computer to transduce the second ambient temperature into a second telemetry signal; and instructions for causing the computer to receive the first telemetry signal from the first thermal sensor and the second telemetry signal from the second thermal sensor at a thermal management controller.

In one example, the non-transitory computer-readable medium further includes instructions for causing the computer to do the following: transform the first telemetry signal into a first digital code and the second telemetry signal into a second digital code at the thermal management controller; relay the first digital code and the second digital code to a central broadcast (CB) unit to produce a first broadcast message and a second broadcast message; and send the first broadcast message and the second broadcast message to a local limit management unit to execute local thermal management for the first subsystem location and the second subsystem location.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

DETAILED DESCRIPTION

Figure 1:
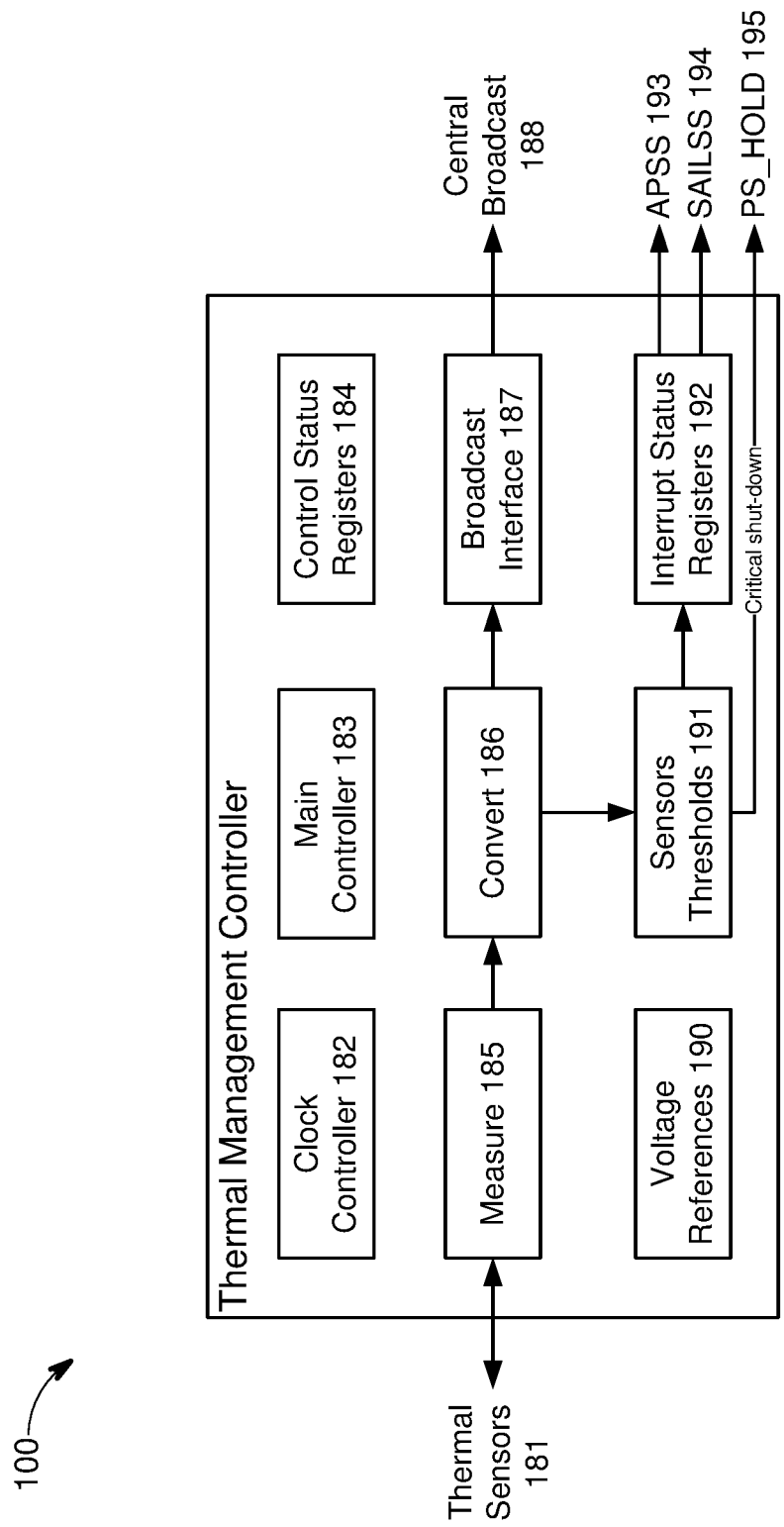
FIG. 1 illustrates an example thermal management controller within a system on a chip (SOC).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Electronic systems are prevalent in modern society within a variety of products and tools. An electronic system relies on an electrical energy source, for example, an alternating current (AC) energy system or an energy storage system (e.g., a battery) to supply the necessary energy for proper functioning of the electronic system. While some of the supplied energy is converted to a useful form, other parts of the supplied energy result in unusable energy, for example, thermal energy, due to fundamental physical laws and properties (e.g., the second law of thermodynamics). The thermal energy tends to raise the ambient temperature of the electronic system which may degrade its performance or may restrict its operability. Therefore, system designers seek thermal management systems which maintain the ambient temperature within a desired temperature range.

In one example, a thermal management system may utilize thermal sensors to monitor temperatures across an electronic system and use the monitored temperatures from a thermal management controller. For example, the thermal management system may regulate temperature ranges or gradients by active power management (e.g., activating or deactivating certain subsystems of the electronic system) or by engaging or disengaging thermal control elements (i.e., heaters, fans, fluid flow, etc.) to maintain a desired thermal environment. In general, the thermal management controller is coupled to a plurality of thermal sensors for temperature monitoring and to a plurality of thermal control elements for temperature regulation.

In one example, there are two types of thermal management systems: a centralized thermal management system and a distributed thermal management system. For example, the centralized thermal management system has all thermal sensors routed to a thermal management controller at one centralized location. For example, the distributed thermal management system has thermal sensors routed to a plurality of thermal management controllers at several distributed locations.

FIG. 1 illustrates an example thermal management controller 100 within a system on a chip (SOC). For example, the SOC includes a SOC die, e.g., a substrate layer which serves as a foundation for the SOC. For example, the SOC die may include a plurality of electronic devices which implement the functionality of the SOC. For example, the thermal management controller 100 includes a clock controller 182, a main controller 183 and a plurality of control status registers 184. In one example, the thermal management controller 100 is part of a thermal management system which also includes or will be coupled to a plurality of thermal sensors 181. In one example, the thermal management controller manages temperature monitoring from the plurality of thermal sensors. For example, a thermal sensor may be implemented using temperature-dependent properties of a transistor. For example, the thermal sensor may be implemented by monitoring a transistor voltage (e.g., base-emitter voltage, VBE) which is monotonically related to temperature. For example, the thermal sensor may be implemented by using a thermistor (i.e., a resistor whose resistance depends on temperature).

In one example, the main controller 183 selects a thermal sensor and sends it to a measure module 185 to provide a temperature measurement, a convert module 186 to provide a digital conversion of the temperature measurement, and a broadcast interface module 187 to generate a control broadcast message to the Central Broadcast (CB) unit 188. In one example, the thermal management controller 100 includes a voltage reference module 190, a sensor threshold module 191 and a plurality of interrupt status registers 192.

In one example, the digital conversion of the temperature measurement is sent to the sensor threshold module 191 which determines if critical shutdown state should be invoked and a power supply hold (PS_HOLD) signal 195 should be de-asserted. In one example, the sensor threshold module 191 should assert interrupts to the application processing subsystem (APSS) 193 and separate interrupts to the safety island subsystem (SAILSS) 194.

In one example, the plurality of thermal sensors includes remote sensors (i.e., thermal sensors external to the thermal management controller 100) and embedded sensors (i.e., thermal sensors internal to the thermal management controller 100). For example, the remote sensors are placed on the SOC die at various locations with high thermal density (e.g., hotspots). For example, locations with high thermal density may include a central processing unit (CPU), a graphics processing unit (GPU), a neural signal processor (NSP), etc.

In one example, the thermal management controller 100 may be instantiated within an always on subsystem (AOSS). For example, the AOSS is a portion of the SOC which is continuously powered during normal operation (i.e., with 100% duty factor). In one example, the thermal management controller 100 includes a plurality of threshold registers to check against the violations of each thermal sensor with a maximum temperature threshold value and a minimum temperature threshold value to trigger a hardware critical shutdown, upper and lower thresholds for software control and a critical high threshold to trigger a fast thermal response in software. For example, a critical hardware shutdown may de-assert a power supply hold control signal (e.g., PS_HOLD signal) to a power management integrated circuit (PMIC) via a global clock controller (GCC). In one example, a de-assertion of the PS_HOLD signal (i.e., low logic level) to the PMIC initiates a reset or power down to protect the SOC from a thermal runaway condition. In one example, an assertion of the PS_HOLD signal (i.e., HIGH logic level) maintains an active power state in the SOC.

In one example, a finite state machine (FSM) which is part of the main controller 183 circuitry selects and polls each embedded sensor in a round robin fashion. In one example, an analog to digital converter (ADC) which is part of the measure module 185 and convert module 186 transforms a measured temperature for each sensor into a digital code and stores the digital code in temperature units (e.g., degrees Celsius, Fahrenheit, or Kelvin or fractions thereof) in the control status registers 184. In one example, the digital code is compared against threshold register values 191 and interrupts will be generated by the interrupt status registers 192 for any temperature violations In one example, the digital code is simultaneously sent to the broadcast interface 187 for the central broadcast unit 188 to broadcast the sensor temperature value to the subsystems.

In one example, the thermal management controller 100 operates continuously, even when the SOC is in sleep mode.

In one example, a centralized thermal management system may introduce several design challenges or constraints. For example, a high quantity of thermal sensors (e.g., approximately 100 or more thermal sensors) may require a correspondingly high quantity of signal (analog) routes from each thermal sensor to the thermal management controller 100. For example, with N remote sensors, the quantity of signal (analog) routes into each thermal management controller 100 may be equal to 2N+2. In one example, the high quantity of signal routes from each thermal sensor may result in routing congestion near the AOSS input/output pads and pins. For example, a circuit floorplan may be fixed and as a result, there may be area wastage around the AOSS where the thermal management controller 100 is located.

In addition, for example, routing congestion due to the high quantity of signal routes may cause digital design difficulties with a large number of nets and may lead in pockets with minimal power grid resources available. For example, a plurality of power grids may be unavailable with the high quantity of signal routes. For example, with fewer available power grids, higher current density and higher circuit resistance may result in a higher supply voltage requirement to compensate for the higher circuit resistance. As a result, the design of the thermal management system may be driven away from a centralized architecture to a more distributed architecture.

In one example, as alternatives to a centralized thermal management system architecture, two architectural embodiments may be considered. For example, a first architectural embodiment represents an external distributed thermal management system architecture. For example, a second architectural embodiment represents an internal distributed thermal management system architecture.

Figure 2:
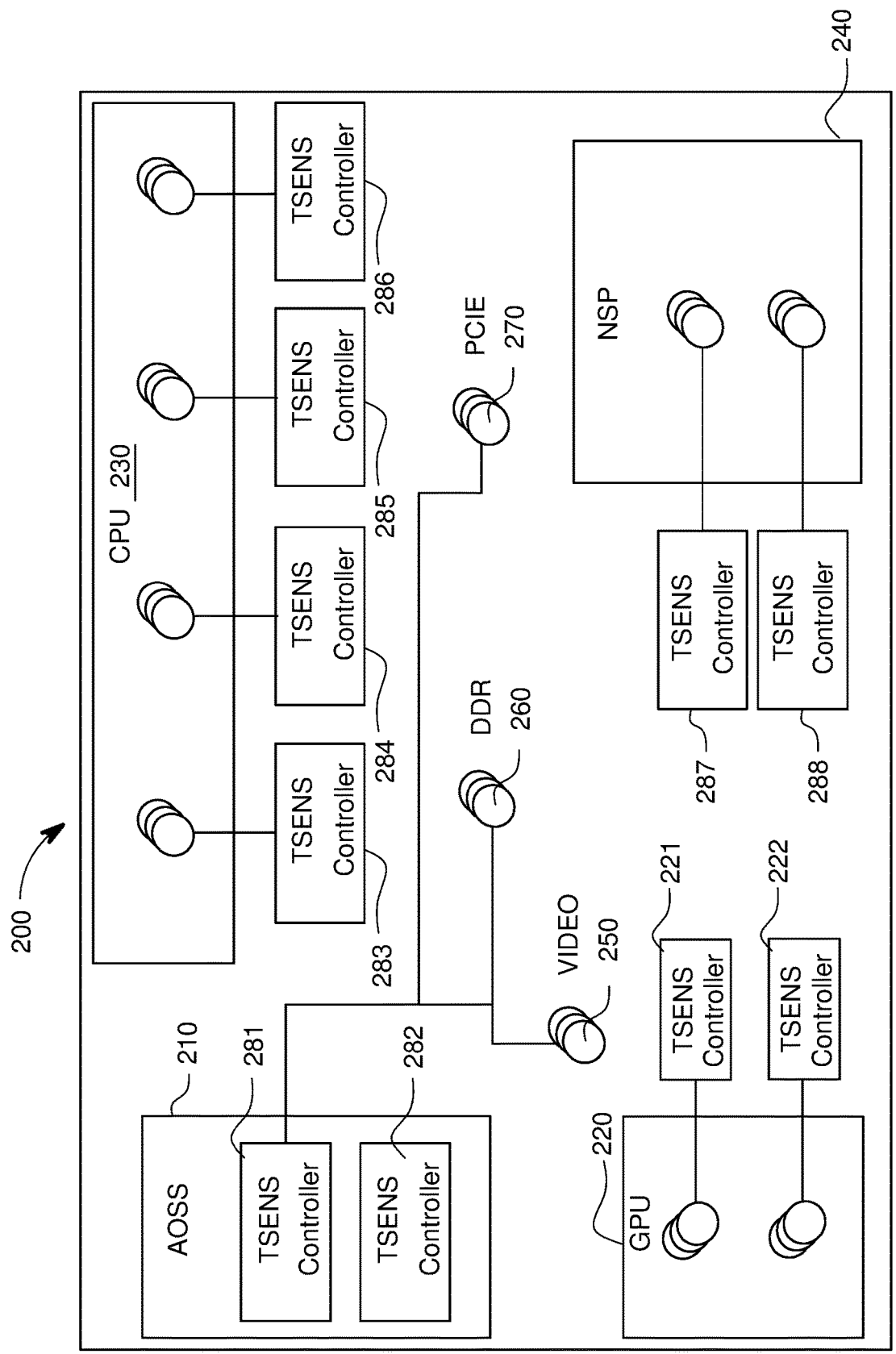
FIG. 2 illustrates an example of an external distributed thermal management system.

FIG. 2 illustrates an example of an external distributed thermal management system 200. For example, the external distributed thermal management system 200 includes a plurality of constituents such as an always on subsystem (AOSS) 210, a graphics processing unit (GPU) 220, a central processing unit (CPU) 230, a neural signal processor (NSP) 240, a video processor 250, a double data rate (DDR) memory unit 260, and a serial databus (e.g., a peripheral component interconnect express, PCIE, bus) 270. In one example, the external distributed thermal management system 200 also includes an audio subsystem, a camera and a computer vision (CV) system.

In one example the external distributed thermal management system 200 includes a plurality of distributed thermal management controllers with a first controller 281 and a second controller 282 locally situated within the AOSS 210, third controller 283, a fourth controller 284, a fifth controller 285 and a sixth controller 286 locally situated outside (e.g., chip top) the CPU 230; a seventh controller 287, an eighth controller 288 locally situated outside (e.g., chip top) the NSP 240, a ninth controller 221 and a tenth controller 222 locally situated outside (e.g., chip top) the GPU 220.

In one example, the distributed thermal management controllers locally situated with the AOSS 210 perform thermal management with thermal sensors which do not have a local distributed thermal management controller. For example, the first controller 281 and the second controller 282 may perform thermal management for thermal sensors in the video processor 250, in the DDR memory unit 260 and in the serial databus 270, as well as the audio subsystem, the camera and the computer vision (CV) system.

In one example, the distributed thermal management controllers locally situated outside (e.g., chip top) the CPU 230 perform local thermal management with thermal sensors embedded in the CPU 230. For example, the third controller 283, the fourth controller 284, the fifth controller 285 and the sixth controller 286 may perform local thermal management with thermal sensors in the CPU 230.

In one example, the distributed thermal management controllers locally situated outside (e.g., chip top) the GPU 220 perform local thermal management with thermal sensors embedded in the GPU 220. For example, the ninth controller 221 and the tenth controller 222 perform local management with thermal sensors in the GPU 220.

In one example, the distributed thermal management controllers locally situated outside (e.g., chip top) the NSP 240 perform local thermal management with thermal sensors embedded in the NSP 240. For example, the seventh controller 287 and the eighth controller 288 perform local thermal management with thermal sensors in the NSP 240.

In one example, the GPU 220 may be a plurality of GPUs with a plurality of thermal management controllers locally situated outside the plurality of GPUs. In one example, the NSP 240 may be a plurality of NSPs with a plurality of thermal management controllers locally situated outside the plurality of NSPs.

Figure 3:
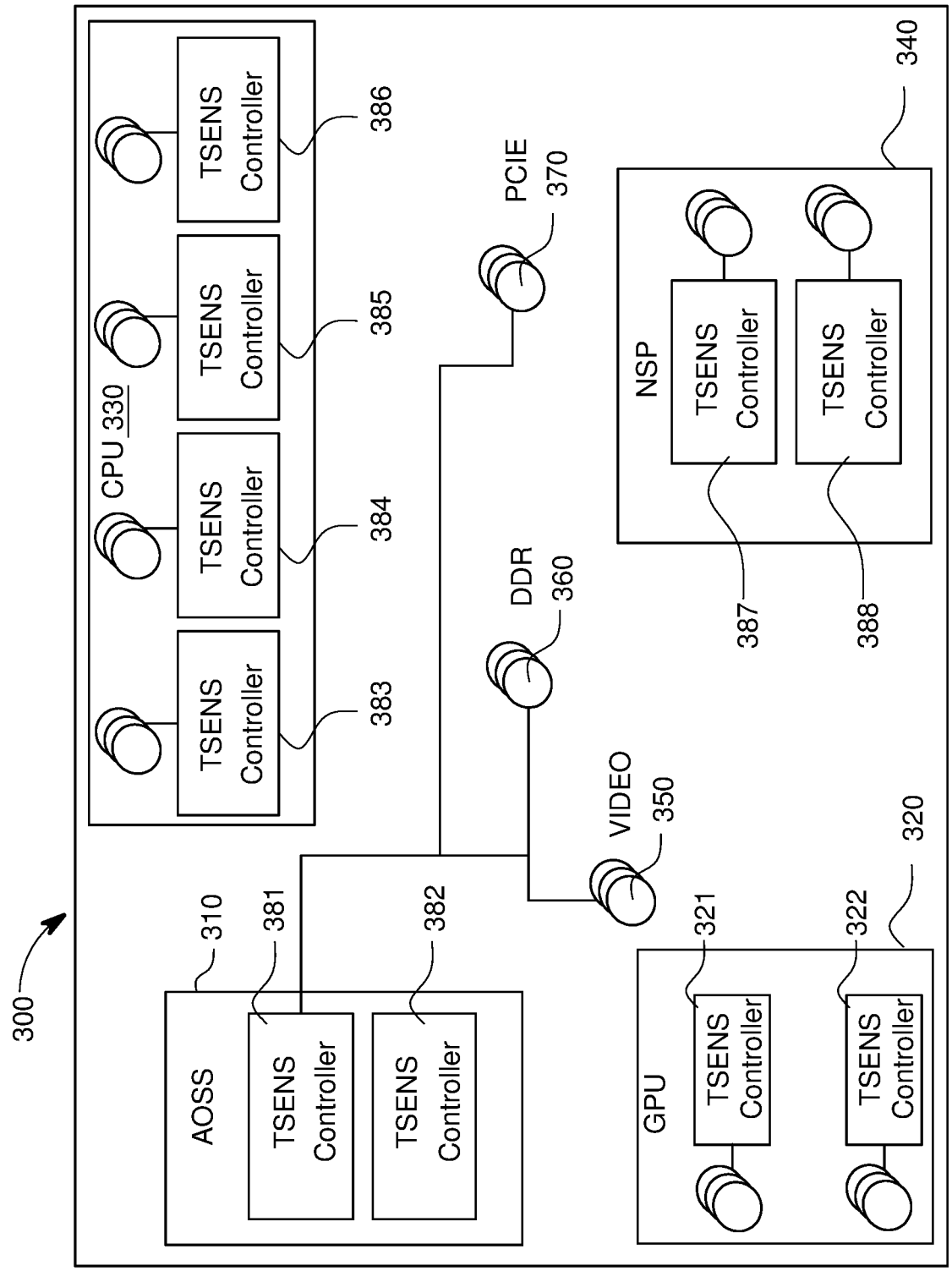
FIG. 3 illustrates an example of an internal distributed thermal management system.

FIG. 3 illustrates an example of an internal distributed thermal management system 300. For example, the internal distributed thermal management system 300 includes a plurality of constituents such as an always on subsystem (AOSS) 310, a graphics processing unit (GPU) 320, a central processing unit (CPU) 330, a neural signal processor (NSP) 340, a video processor 350, a double data rate (DDR) memory unit 360, and a serial databus (e.g., a peripheral component interconnect express, PCIE, bus) 370. In one example, the internal distributed thermal management system 300 also includes an audio system, a camera, and a computer vision (CV) system.

In one example the internal distributed thermal management system 300 includes a plurality of distributed thermal management controllers with a first controller 381 and a second controller 382 locally situated within the AOSS 310; a third controller 383, a fourth controller 384, a fifth controller 385 and a sixth controller 386 locally situated within the CPU 330; a seventh controller 387 and an eighth controller 388 locally situated within the NSP 340, a ninth controller 321 and a tenth controller 322 locally situated within the GPU 320.

In one example, the distributed thermal management controllers locally situated within the AOSS 310 perform thermal management with thermal sensors which do not have a local distributed thermal management controller. For example, the first controller 381 and the second controller 382 may perform thermal management for thermal sensors in the video processor 350 and in the DDR memory unit 360 as well as the audio system, the camera and the computer vision (CV) system.

In one example, the distributed thermal management controllers locally situated within the CPU 330 perform local thermal management with thermal sensors embedded in the CPU 330. For example, the third controller 383, the fourth controller 384, the fifth controller 385 and the sixth controller 386 may perform local thermal management with thermal sensors in the CPU 330.

In one example, the distributed thermal management controllers locally situated within the GPU 320 perform local thermal management with thermal sensors embedded in the GPU 320. For example, the ninth controller 321 and the tenth controller 322 perform local management with thermal sensors in the GPU 320.

In one example, the distributed thermal management controllers locally situated within the NSP 340 perform local thermal management with thermal sensors embedded in the NSP 340. For example, the seventh controller 387 and the eighth controller 388 perform local thermal management with thermal sensors in the NSP 340.

In one example, the GPU 320 may be a plurality of GPUs with a plurality of thermal management controllers locally situated within the plurality of GPUs. In one example, the NSP 340 may be a plurality of NSPs with a plurality of thermal management controllers locally situated within the plurality of NSPs.

Figure 4:
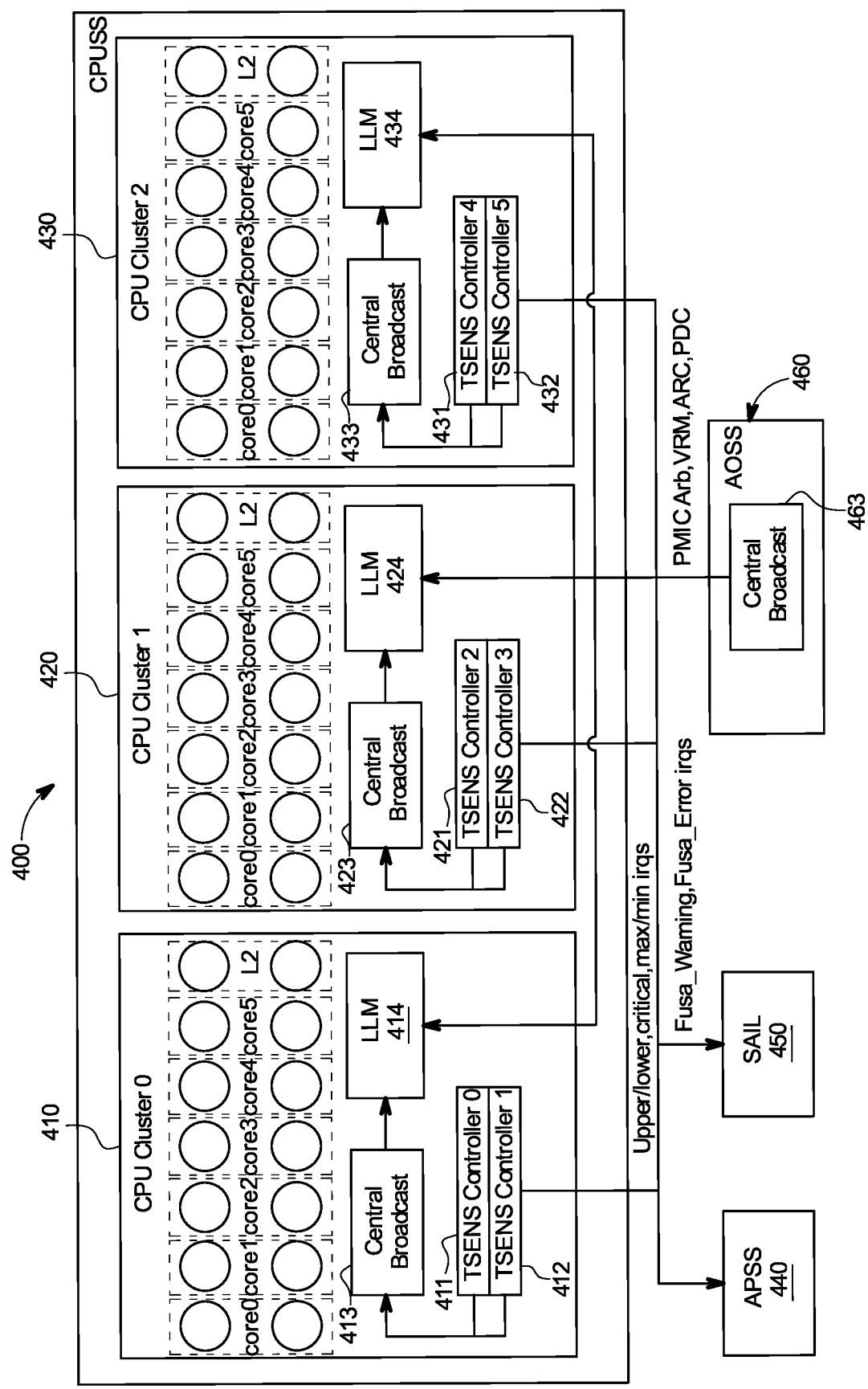
FIG. 4 illustrates an example detailed block diagram of a CPU subsystem (CPUSS) for an internal distributed thermal management system.

FIG. 4 illustrates an example detailed block diagram of a CPU subsystem (CPUSS) 400 for a distributed thermal management system. For example, the distributed thermal management system places thermal management controllers into distributed loads with high current density and high thermal dissipation close to local thermal sensors, such as the CPUSS. In one example, the distributed thermal management system connects other thermal sensors (e.g., remote thermal sensors) to a thermal management controller into a central load, such as the AOSS. In one example, the CPU subsystem 400 includes a plurality of CPU clusters. In one example, each CPU cluster includes a plurality of CPU cores (i.e., individual processing units). In one example, each CPU core includes a plurality of thermal sensors to monitor CPU core temperatures. In one example, the plurality of thermal sensors is connected to at least one thermal management controller.

In one example, the CPUSS 400 includes a first CPU cluster 410 (CPU Cluster 0), a second CPU cluster 420 (CPU Cluster 1) and a third CPU cluster 430 (CPU Cluster 2).

In one example, the first CPU cluster 410 includes a plurality of CPU cores and a cache memory (e.g., first level, L1, cache memory). In one example, the first CPU cluster 410 also includes a first central broadcast (CB) unit 413 and a first local limit management (LLM) unit 414.

In one example, the first CPU cluster 410 also includes a first thermal management controller 411 and a second thermal management controller 412. In one example, the first thermal management controller 411 and the second thermal management controller 412 are redundantly connected to each thermal sensor of the first CPU cluster 410 in a crisscross configuration. For example, each CPU core may include two thermal sensors for redundancy. In one example, there is a signal route between each thermal sensor of each CPU core and the thermal management controllers of the first CPU cluster 410. In one example, the first CPU cluster 410 includes thermal limit management hardware executed by the first thermal management controller 411 and the second thermal management controller 412.

In one example, the first CB unit 413 is connected to the first thermal management controller 411 and the second thermal management controller 412 to receive digitized temperature data derived from each thermal sensor of each CPU core of the first CPU cluster 410. That is, the thermal management controllers 411, 412 receive temperature data from thermal sensors to generate digitized temperature data based on the received temperature data from the thermal sensors.

In one example, the first CB unit 413 relays the digitized temperature data to the first LLM unit 414. In one example, the first LLM unit 414 executes a thermal management procedure if the digitized temperature data indicates that predetermined thermal limits have been exceeded (e.g., if thermal sensor temperature is hotter than an allowed maximum temperature or colder than an allowed minimum temperature). In one example, the first LLM unit 414 is also connected to other subsystem data such as PMIC arbiter data, voltage regulator manager (VRM) data, aggregate resource control (ARC) data, power domain controller (PDC) data, etc.

In one example, the first thermal management controller 411 and the second thermal management controller 412 obtain dc power from a core logic power rail (e.g., APSS_CX rail) and retains memory state in its registers from a memory power rail (e.g., MXA) to save power in rock bottom sleep. For example, a cold temperature condition (e.g., 0 degrees Celsius) may be monitored by remote thermal sensors connected to thermal management controllers in an AOSS 460 using a fourth CB unit 463. In one example, a safety warning or error message may be routed to a safety island (SAIL) 450 subsystem using interrupt request (IRQ) signals. In one example, SAILSS may perform users defined safety policy actions such as increasing fan speed or turn off non-critical use-cases upon receiving a warning interrupt and perform a software graceful shutdown upon receiving an error interrupt.

In one example, an application processor subsystem (APSS) 440 executes a user application. In one example, the APSS 440 may limit or interrupt the user application upon receiving an upper, lower or critical interrupt.

In one example, the second CPU cluster 420 includes a plurality of CPU cores and a cache memory (e.g., first level, L1, cache memory). In one example, the second CPU cluster 420 also includes a second central broadcast (CB) unit 423 and a second local limit management (LLM) unit 424.

In one example, the second CPU cluster 420 also includes a third thermal management controller 421 and a fourth thermal management controller 422. In one example, the third thermal management controller 421 and the fourth thermal management controller 422 are redundantly connected to each thermal sensor of the second CPU cluster 420 in a crisscross configuration. For example, each CPU core includes two thermal sensors for redundancy. For example, there is a signal route between each thermal sensor of each CPU core and the thermal management controllers of the second CPU cluster 420. In one example, the second CPU cluster 420 includes thermal limit management hardware executed by the third thermal management controller 421 and the fourth thermal management controller 422.

In one example, the second CB unit 423 is connected to the third thermal management controller 421 and the fourth thermal management controller 422 to receive digitized temperature data derived from each thermal sensor of each CPU core of the second CPU cluster 420. In one example, the second CB unit 423 relays the digitized temperature data to the second LLM unit 424. That is, the thermal management controllers 421, 422 receive temperature data from thermal sensors to generate digitized temperature data based on the received temperature data from the thermal sensors.

In one example, the second LLM unit 424 executes a thermal management procedure if the digitized temperature data indicates that predetermined thermal limits have been exceeded (e.g., if thermal sensor temperature is hotter than an allowed maximum temperature or colder than an allowed minimum temperature). In one example, the second LLM unit 424 is also connected to other subsystem data such as PMIC arbiter data, voltage regulator manager (VRM) data, aggregate resource control (ARC) data, power domain controller (PDC) data, etc.

In one example, the third thermal management controller 421 and the fourth thermal management controller 422 obtain dc power from the core logic power rail (e.g., APSS_CX rail) and retains memory state in its registers from the memory power rail (e.g., MXA) to save power in rock bottom sleep. For example, a cold temperature condition (e.g., 0 degrees Celsius) may be monitored by remote thermal sensors connected to thermal management controllers in the AOSS 460 using a fourth CB unit 463. In one example, a safety warning or error message may be routed to the safety island (SAIL) 450 subsystem using interrupt request (IRQ) signals. In one example, SAILSS may perform users defined safety policy actions such as increasing fan speed or turn off non-critical use-cases upon receiving a warning interrupt and perform a software graceful shutdown upon receiving an error interrupt.

In one example, an application processor subsystem (APSS) 440 executes a user application. In one example, the APSS 440 may limit or interrupt the user application upon receiving an upper, lower or critical interrupt.

In one example, the third CPU cluster 430 includes a plurality of CPU cores and a cache memory (e.g., first level, L1, cache memory). In one example, the third CPU cluster 430 also includes a third central broadcast (CB) unit 433 and a third local limit management (LLM) unit 434.

In one example, the third CPU cluster 430 also includes a fifth thermal management controller 431 and a sixth thermal management controller 432. In one example, the fifth thermal management controller 431 and the sixth thermal management controller 432 are redundantly connected to each thermal sensor of the third CPU cluster 430 in a crisscross configuration. For example, each CPU core may include two thermal sensors for redundancy. In one example, there is a signal route between each thermal sensor of each CPU core and the thermal management controllers of the third CPU cluster 430. In one example, the third CPU cluster 430 includes thermal limit management hardware executed by the fifth thermal management controller 431 and the sixth thermal management controller 432.

In one example, the third CB unit 433 is connected to the fifth thermal management controller 431 and the sixth thermal management controller 432 to receive digitized temperature data derived from each thermal sensor of each CPU core of the third CPU cluster 430. In one example, the third CB unit 433 relays the digitized temperature data to the third LLM unit 434. That is, the thermal management controllers 431, 432 receive temperature data from thermal sensors to generate digitized temperature data based on the received temperature data from the thermal sensors.

In one example, the third LLM unit 434 executes a thermal management procedure if the digitized temperature data indicates that predetermined thermal limits have been exceeded (e.g., if thermal sensor temperature is hotter than an allowed maximum temperature or colder than an allowed minimum temperature). In one example, the third LLM unit 434 is also connected to other subsystem data such as PMIC arbiter data, voltage regulator manager (VRM) data, aggregate resource control (ARC) data, power domain controller (PDC) data, etc.

In one example, the fifth thermal management controller 431 and the sixth thermal management controller 432 obtain dc power from the core logic power rail (e.g., APSS_CX rail) and retains memory state in its registers from the memory power rail (e.g., MXA) to save power in rock bottom sleep. For example, a cold temperature condition (e.g., 0 degrees Celsius) may be monitored by remote thermal sensors connected to thermal management controllers in an AOSS 460 using a third CB unit 463. In one example, a safety warning or error message may be routed to a safety island (SAIL) 450 subsystem using interrupt request (IRQ) signals. In one example, SAILSS may perform users defined safety policy actions such as increasing fan speed or turn off non-critical use-cases upon receiving a warning interrupt and perform a software graceful shutdown upon receiving an error interrupt. In one example, an application processor subsystem (APSS) 440 executes a user application.

In one example, the APSS 440 may limit or interrupt the user application upon receiving an upper, lower or critical interrupt. In one example, the CB units (413, 423, 433, 463) are optional and the thermal management controllers may couple directly to the LLM units.

Figure 4A:
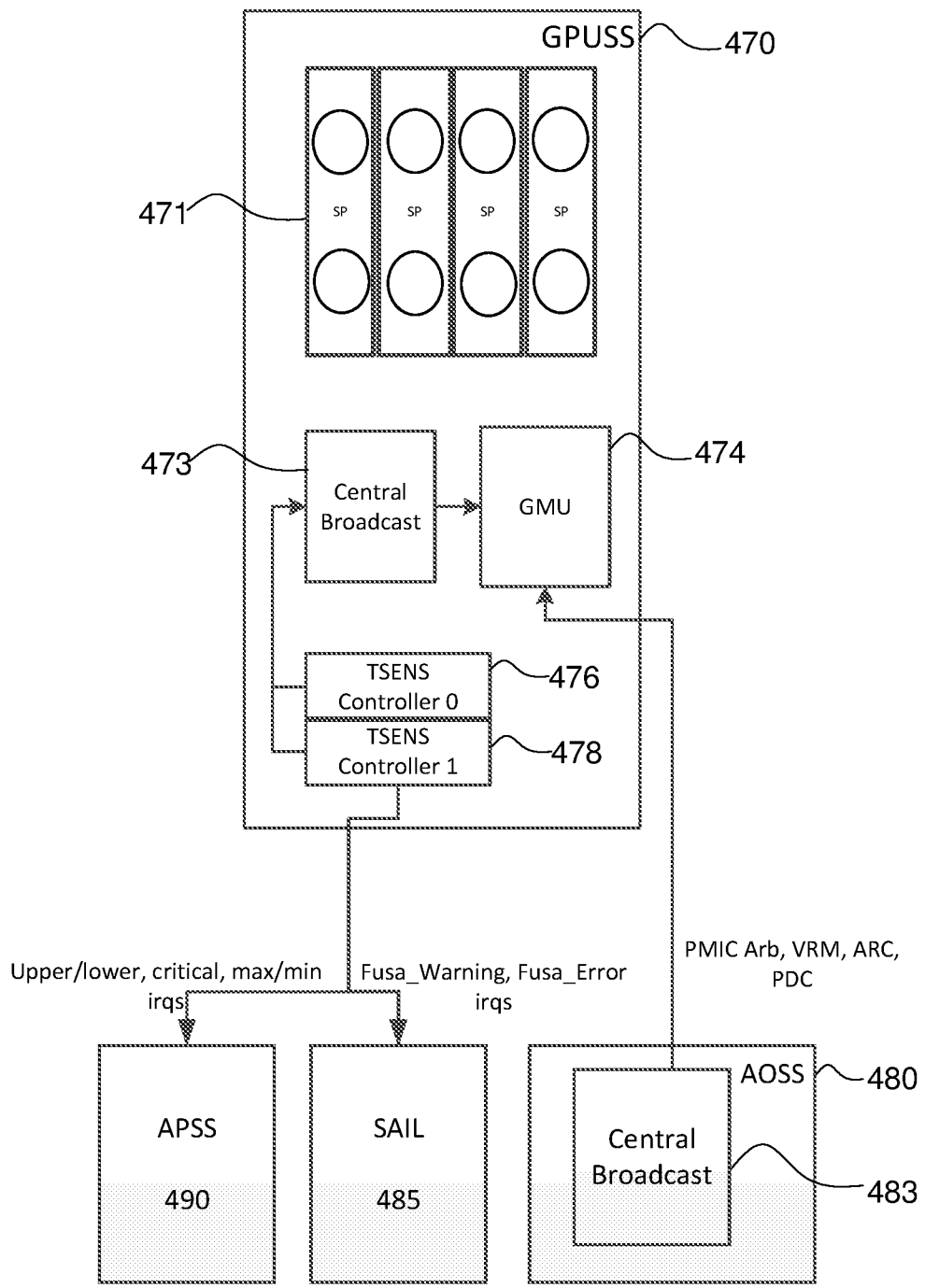
FIG. 4A illustrates an example detailed block diagram of a graphical processing unit subsystem (GPUSS) for a distributed thermal management system.

FIG. 4A illustrates an example detailed block diagram of a graphical processing unit subsystem (GPUSS) 470 for a distributed thermal management system. In one example, the distributed thermal management system places thermal management controllers into distributed loads with high current density and high thermal dissipation close to local thermal sensors, such as the GPUSS 470. In one example, the distributed thermal management system connects other thermal sensors (e.g., remote thermal sensors) to a thermal management controller into a central load, such as the AOSS. In one example, the GPUSS 470 includes a GPU cluster 471. In one example, the GPU cluster 471 includes a plurality of GPU cores and a cache memory. In one example, the plurality of GPU cores are shader processors (SPs) with two thermal sensors per GPU cores (or SP). For example, each GPU core may include a plurality of thermal sensors to monitor GPU core temperatures. In one example, the plurality of thermal sensors is connected to at least one thermal management controller.

In one example, the GPU cluster 471 includes a first central broadcast (CB) unit 473 and a graphics management unit (GMU) 474.

In one example, the GPU cluster 471 also includes a first thermal management controller 476 and a second thermal management controller 478. In one example, the first thermal management controller 476 and the second thermal management controller 478 are redundantly connected to each thermal sensor of the GPU cluster 471 in a crisscross configuration. For example, each GPU core may include two thermal sensors for redundancy. In one example, there is a signal route between each thermal sensor of each GPU core and the thermal management controllers of the GPU cluster 471. In one example, the GPU cluster 471 includes graphics management unit (GMU) hardware executed by the first thermal management controller 411 and the second thermal management controller 412.

In one example, the first CB unit 473 is connected to the first thermal management controller 476 and the second thermal management controller 478 to receive digitized temperature data derived from each thermal sensor of each GPU core of the GPU cluster 471. In one example, the GMU 474 manages and controls power and thermal resources for the GPUSS 470.

In one example, the first thermal management controller 476 and the second thermal management controller 478 obtain de power from a core logic power rail (e.g., VDD-GFX rail) and retains memory state in its registers from a memory power rail (e.g., MXA) to save power in rock bottom sleep. For example, a cold temperature condition (e.g., 0 degrees Celsius) may be monitored by remote thermal sensors connected to thermal management controllers in an AOSS 480 using a second CB unit 483.

In one example, a safety warning or error message may be routed to a safety island (SAIL) 485 subsystem using interrupt request (IRQ) signals. In one example, SAILSS may perform users defined safety policy actions such as increasing fan speed or turn off non-critical use-cases upon receiving a warning interrupt and perform a software graceful shutdown upon receiving an error interrupt.

In one example, an application processor subsystem (APSS) 490 executes a user application. In one example, the APSS 490 may limit or interrupt the user application upon receiving an upper, lower or critical interrupt. In one example, the second CB unit 483 is optional and the thermal management controllers may couple directly to the GMU 474.

Figure 5:
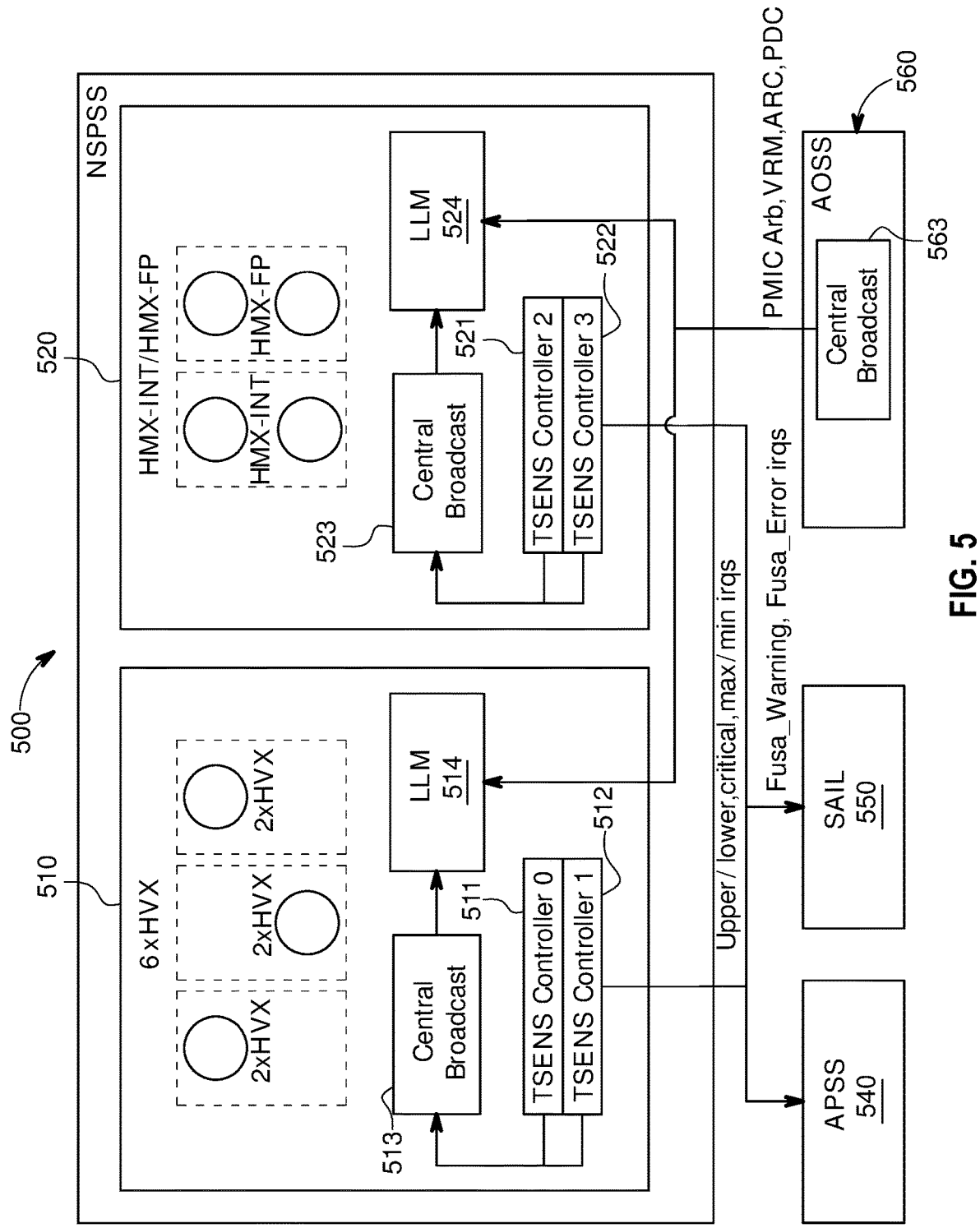
FIG. 5 illustrates an example detailed block diagram of a neural signal processor (NSP) subsystem (NSPSS) for a distributed thermal management system.

FIG. 5 illustrates an example detailed block diagram of a neural signal processor (NSP) subsystem (NSPSS) 500 for a distributed thermal management system. In one example, the distributed thermal management system places thermal management controllers into distributed loads with high current density and high thermal dissipation close to local thermal sensors, such as the NSPSS 500. In one example, the distributed thermal management system connects other thermal sensors (e.g., remote thermal sensors) to a thermal management controller into a central load, such as the AOSS. In one example, the NSP subsystem 500 includes a plurality of NSP clusters. For example, each NSP cluster includes a plurality of NSP cores (i.e., individual processing units). For example, each NSP core may include a plurality of thermal sensors to monitor NSP core temperatures. In one example, the plurality of thermal sensors is connected to at least one thermal management controller.

In one example, the NSPSS 500 includes a first NSP cluster 510 (e.g., Hexagon Vector Extension units) and a second NSP cluster 520 (Hexagon Matrix Extension units).

In one example, the first NSP cluster 510 includes a plurality of NSP cores and a cache memory (e.g., first level, L1, cache memory). In one example, the first NSP cluster 510 also includes a first central broadcast (CB) unit 513 and a first local limit management (LLM) unit 514.

In one example, the first NSP cluster 510 also includes a first thermal management controller 511 and a second thermal management controller 512. In one example, the first thermal management controller 511 and the second thermal management controller 512 are redundantly connected to each thermal sensor of the first NSP cluster 510 in a crisscross configuration. For example, each NSP core may include a plurality of thermal sensors for redundancy. In one example, there is a signal route between each thermal sensor of each NSP core and the thermal management controllers of the first NSP cluster 510. In one example, the first NSP cluster 510 includes thermal limit management hardware executed by the first thermal management controller 511 and the second thermal management controller 512.

In one example, the first CB unit 513 is connected to the first thermal management controller 511 and the second thermal management controller 512 to receive digitized temperature data derived from each thermal sensor of each NSP core of the first NSP cluster 510. In one example, the first CB unit 513 relays the digitized temperature data to the first LLM unit 514. That is, the thermal management controllers 511, 512 receive temperature data from thermal sensors to generate digitized temperature data based on the received temperature data from the thermal sensors.

In one example, the first LLM unit 514 executes a thermal management procedure if the digitized temperature data indicates that predetermined thermal limits have been exceeded (e.g., if thermal sensor temperature is hotter than an allowed maximum temperature or colder than an allowed minimum temperature). In one example, the first LLM unit 514 is also connected to other subsystem data such as PMIC arbiter data, voltage regulator manager (VRM) data, aggregate resource control (ARC) data, power domain controller (PDC) data, etc.

In one example, the first thermal management controller 511 and the second thermal management controller 512 obtain de power from a core logic power rail (e.g., NSP_CX rail) and retains memory state in its registers from a memory power rail (e.g., MXA) to save power in rock bottom sleep. For example, a cold temperature condition (e.g., 0 degrees Celsius) may be monitored by remote thermal sensors connected to thermal management controllers in an AOSS 560 using a third CB unit 563. In one example, a safety warning or error message may be routed to a safety island (SAIL) 550 subsystem using interrupt request (IRQ) signals. In one example, SAILSS may perform users defined safety policy actions such as increasing fan speed or turn off non-critical use-cases upon receiving a warning interrupt and perform a software graceful shutdown upon receiving an error interrupt.

In one example, an application processor subsystem (APSS) 540 executes user application. In one example, the APSS 540 may limit or interrupt the user application upon receiving an upper, lower or critical interrupt. In one example, the first CB unit 513 is optional and the thermal management controllers may couple directly to the LLM 514.

In one example, the second NSP cluster 520 includes a plurality of NSP cores and a cache memory (e.g., first level, L1, cache memory). In one example, the second NSP cluster 520 also includes a second central broadcast (CB) unit 523 and a second local limit management (LLM) unit 524.

In one example, the second NSP cluster 520 also includes a third thermal management controller 521 and a fourth thermal management controller 522. In one example, the third thermal management controller 521 and the fourth thermal management controller 522 are redundantly connected to each thermal sensor of the second NSP cluster 520 in a crisscross configuration. For example, each NSP core includes a plurality of thermal sensors for redundancy. For example, there is a signal route between each thermal sensor of each NSP core and the thermal management controllers of the second NSP cluster 520. In one example, the second NSP cluster 520 includes thermal limit management hardware executed by the third thermal management controller 521 and the fourth thermal management controller 522.

In one example, the second CB unit 523 is connected to the third thermal management controller 521 and the fourth thermal management controller 522 to receive digitized temperature data derived from each thermal sensor of each NSP core of the second NSP cluster 520. In one example, the second CB unit 523 relays the digitized temperature data to the second LLM unit 524. That is, the thermal management controllers 521, 522 receive temperature data from thermal sensors to generate digitized temperature data based on the received temperature data from the thermal sensors.

In one example, the second LLM unit 524 executes a thermal management procedure if the digitized temperature data indicates that predetermined thermal limits have been exceeded (e.g., if thermal sensor temperature is hotter than an allowed maximum temperature or colder than an allowed minimum temperature). In one example, the second LLM unit 524 is also connected to other subsystem data such as PMIC arbiter data, voltage regulator manager (VRM) data, aggregate resource control (ARC) data, power domain controller (PDC) data, etc.

In one example, the third thermal management controller 521 and the fourth thermal management controller 522 obtain dc power from a core logic power rail (e.g., NSP_CX rail) and retains memory state in its registers from a memory power rail (e.g., MXA) to save power in rock bottom sleep. For example, a cold temperature condition (e.g., 0 degrees Celsius) may be monitored by remote thermal sensors connected to thermal management controllers in an AOSS 560 using a third CB unit 563. In one example, a safety warning or error message may be routed to a safety island (SAIL) 550 subsystem using interrupt request (IRQ) signals. In one example, SAILSS may perform users defined safety policy actions such as increasing fan speed or turn off non-critical use-cases upon receiving a warning interrupt and perform a software graceful shutdown upon receiving an error interrupt.

In one example, an application processor subsystem (APSS) 540 executes user application. In one example, the APSS 540 may limit or interrupt the user application upon receiving an upper, lower or critical interrupt. In one example, the second CB unit 523 is optional and the thermal management controllers may couple directly to the LLM 524.

In one example, the distributed thermal management system includes management software for operations and control functions. For example, the management software may be initialized in the extensible Boot Loader (XBL). In one example, the thermal management controller will generate upper interrupt, lower interrupt, OC interrupt, critical interrupt, maximum interrupt and minimum interrupt signals to a software driver within the APSS when any thermal sensors are violating their respective temperature thresholds. In one example, the thermal management controller will generate a safety warning interrupt to the SAILSS due to any thermal sensors violating their upper, lower or OC temperature thresholds. In one example, the thermal management controller will generate a safety error interrupt to the SAILSS due to any thermal sensors violating their critical, maximum or minimum temperature thresholds or when any logic errors are detected in the controller configuration registers.

In one example, design of the distributed thermal management system accounts for operation of a thermal combiner module and of a voltage monitor (VMON) module.

Figure 6:
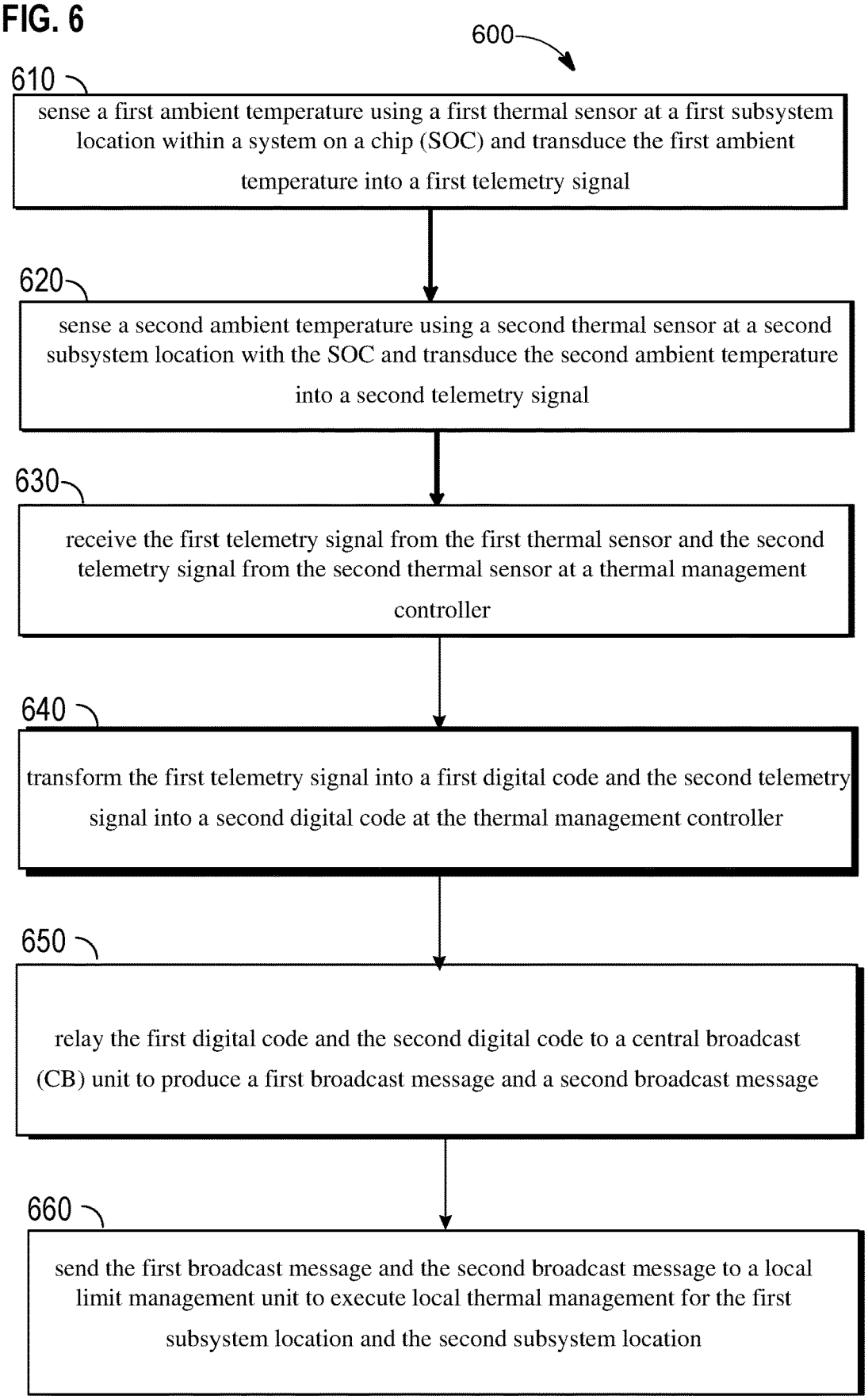
FIG. 6 illustrates an example flow diagram for a distributed thermal management system for a system on a chip (SOC).

FIG. 6 illustrates an example flow diagram 600 for a distributed thermal management system for a system on a chip (SOC). In one example, the SOC includes a plurality of subsystems. For example, the plurality of subsystems may include an always on subsystem (AOSS), a graphics processing unit (GPU), a central processing unit (CPU), a neural signal processor (NSP), a video processor, a memory controller unit, a serial databus, etc.

In block 610 sense a first ambient temperature using a first thermal sensor at a first subsystem location within a system on a chip (SOC) and transduce the first ambient temperature into a first telemetry signal. That is, a first ambient temperature is sensed using a first thermal sensor at a first subsystem location within the SOC and transduce the first ambient temperature into a first telemetry signal. In one example, there are redundant thermal sensors at the first subsystem location within the SOC. In one example, the first telemetry signal is monotonically related to the first ambient temperature. In one example, the first telemetry signal is linearly related to the first ambient temperature.

In block 620, sense a second ambient temperature using a second thermal sensor at a second subsystem location with the SOC and transduce the second ambient temperature into a second telemetry signal. That is, a second ambient temperature is sensed using a second thermal sensor at a second subsystem location with the SOC and the second ambient temperature is transduced into a second telemetry signal. In one example, the second subsystem location is the same as the first subsystem location. In one example, the second subsystem location is different than the first subsystem location. In one example, the first subsystem location and the second subsystem location are in a same subsystem of the plurality of subsystems of the SOC. In one example, the first subsystem location and the second subsystem location are in two different subsystems of the plurality of subsystems of the SOC. In one example, there are redundant thermal sensors at the second subsystem location within the SOC. In one example, the second telemetry signal is monotonically related to the second ambient temperature. In one example, the second telemetry signal is linearly related to the second ambient temperature.

In block 630, receive the first telemetry signal from the first thermal sensor and the second telemetry signal from the second thermal sensor at a thermal management controller. That is the first telemetry signal from the first thermal sensor and the second telemetry signal from the second thermal sensor are received at a thermal management controller. In one example, the thermal management controller is in the same subsystem of the plurality of subsystems of the SOC. In one example, the thermal management controller is in one of the two different subsystems of the plurality of subsystems of the SOC.

In block 640, transform the first telemetry signal into a first digital code and the second telemetry signal into a second digital code at the thermal management controller. That is the first telemetry signal is transformed into a first digital code and the second telemetry signal is transformed into a second digital code at the thermal management controller. In one example, the first digital code is a proportional representation of the first ambient temperature. In one example, the second digital code is a proportional representation of the second ambient temperature. In one example, the first digital code is a nonlinear representation of the first ambient temperature. In one example, the second digital code is a nonlinear representation of the second ambient temperature. In one example, the first digital code and the second digital code are uncompressed quantized versions of the first ambient temperature and the second ambient temperature, respectively. In one example, the first digital code and the second digital code are compressed quantized versions of the first ambient temperature and the second ambient temperature, respectively. For example, the compressed quantized version employs fewer bits than the uncompressed quantized version.

In block 650, relay the first digital code and the second digital code to a central broadcast (CB) unit to produce a first broadcast message and a second broadcast message. That is, the first digital code and the second digital code are relayed to a central broadcast (CB) unit to produce a first broadcast message and a second broadcast message. In one example, the CB unit conforms to a broadcast network protocol to transmit data. In one example, the CB unit is optional and the thermal management controllers may couple directly to the local limit management unit.

In block 660, send the first broadcast message and the second broadcast message to a local limit management unit to execute local thermal management for the first subsystem location and the second subsystem location. That is, the first broadcast message and the second broadcast message are sent to local limit management unit to execute local thermal management for the first subsystem location and the second subsystem location. In one example, the local thermal management is independent of a centralized thermal management system for the SOC. In one example, the local limit management unit accepts auxiliary data from the centralized thermal management system for the execution of local thermal management. For example, the auxiliary data includes power management integrated circuit (PMIC) arbiter data, voltage regulator manager (VRM) data, aggregate resource control (ARC) data, power domain controller (PDC) data, temperature data, etc.

In one aspect, one or more of the steps for providing a distributed thermal management architecture in FIG. 6 may be executed by one or more processors which may include hardware, software, firmware, etc. The one or more processors, for example, may be used to execute software or firmware needed to perform the steps in the flow diagram of FIG. 6. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus for implementing thermal management, the apparatus comprising:
    a serial databus;
    a central processing unit (CPU) coupled to the serial databus;
    a graphics processing unit (GPU) coupled to the serial databus;
    a neural signal processor (NSP) coupled to the serial databus;
    an always on subsystem (AOSS) coupled to the serial databus; wherein the serial databus, the CPU, the GPU, the NSP and the AOSS are implemented on a system on a chip (SOC);
    wherein the CPU comprises a first plurality of thermal sensors and a first plurality of controllers, and each of the first plurality of thermal sensors is coupled to each of the first plurality of controllers;
    wherein the GPU comprises a second plurality of thermal sensors and a second plurality of controllers, and each of the second plurality of thermal sensors is coupled to each of the second plurality of controllers;
    wherein the NSP comprises a third plurality of thermal sensors and a third plurality of controllers, and each of the third plurality of thermal sensors is coupled to each of the third plurality of controllers; and
    wherein the AOSS comprises a fourth plurality of thermal sensors and a fourth plurality of controllers, and each of the fourth plurality of thermal sensors is coupled to each of the fourth plurality of controllers.

2. The apparatus of claim 1, wherein the CPU further comprises a first plurality of central broadcast (CB) units, wherein each of the first plurality of CB units is coupled to the each of the first plurality of controllers.

3. The apparatus of claim 2, wherein each of the first plurality of controllers is configured to generate a digitized temperature data based on a thermal data received from the each of the first plurality of thermal sensors.

4. The apparatus of claim 3, further comprising a first plurality of local limit management (LLM) units, wherein each of the first plurality of LLM units is coupled to the each of the first plurality of CB units, and wherein each of the first plurality of LLM units is configured to execute a thermal management procedure based on whether the digitized temperature data has exceeded a predetermined thermal limit.

5. The apparatus of claim 2, wherein the GPU further comprises a second plurality of central broadcast (CB) units, wherein each of the second plurality of CB units is coupled to the each of the second plurality of controllers.

6. The apparatus of claim 5, wherein each of the second plurality of controllers is configured to generate a digitized temperature data based on a thermal data received from the each of the second plurality of thermal sensors.

7. The apparatus of claim 6, further comprising a graphics management unit (GMU), wherein the GMU is coupled to the each of the second plurality of CB units, and wherein the GMU is configured to execute a thermal management procedure based on whether the digitized temperature data has exceeded a predetermined thermal limit.

8. The apparatus of claim 5, wherein the NSP further comprises a third plurality of central broadcast (CB) units, wherein each of the third plurality of CB units is coupled to the each of the third plurality of controllers.

9. The apparatus of claim 8, wherein each of the third plurality of controllers is configured to generate digitized temperature data based on thermal data received from the each of the third plurality of thermal sensors.

10. The apparatus of claim 9, further comprising a second plurality of local limit management (LLM) units, wherein each of the second plurality of LLM units is coupled to the each of the third plurality of CB units, and wherein each of the second plurality of LLM units is configured to execute a thermal management procedure based on whether the digitized temperature data has exceeded a predetermined thermal limit.

11. The apparatus of claim 8, wherein the AOSS further comprises a fourth plurality of central broadcast (CB) units, wherein each of the fourth plurality of CB units is coupled to the each of the fourth plurality of controllers.

12. The apparatus of claim 11, wherein each of the fourth plurality of controllers is configured to generate digitized temperature data based on thermal data received from the each of the fourth plurality of thermal sensors.

13. The apparatus of claim 12, further comprising
    an audio processor coupled to the serial databus;
    a camera processor coupled to the serial databus;
    a computer vision processor coupled to the serial databus;
    a video processor coupled to the serial databus;
    a RDMA over Converged Ethernet (RoCE) processor coupled to the serial databus; and
    a double data rate (DDR) memory controller unit coupled to the serial databus,
    wherein one or more of the fourth plurality of thermal sensors is configured to measure the temperature of the audio, camera, computer vision, video, RoCE processors; and wherein one or more of the fourth plurality of thermal sensors is configured to measure the temperature of the DDR memory controller unit.

14. A method for implementing thermal management, the method comprising:
    sensing a first ambient temperature using a first thermal sensor at a first subsystem location within a system on a chip (SOC);
    transducing the first ambient temperature into a first telemetry signal;
    sensing a second ambient temperature using a second thermal sensor at a second subsystem location with the SOC;
    transducing the second ambient temperature into a second telemetry signal;
    receiving the first telemetry signal from the first thermal sensor and the second telemetry signal from the second thermal sensor at a thermal management controller;

transforming the first telemetry signal into a first digital code and the second telemetry signal into a second digital code at the thermal management controller; and relaying the first digital code and the second digital code to a central broadcast (CB) unit to produce a first broadcast message and a second broadcast message.

15. The method of claim 14, wherein the first digital code is a proportional representation of the first ambient temperature.

16. The method of claim 14, wherein the first digital code is a nonlinear representation of the first ambient temperature.

17. The method of claim 14, wherein the first digital code is an uncompressed quantized version of the first ambient temperature and the second digital code is an uncompressed quantized version of the second ambient temperature.

18. The method of claim 14, wherein the first digital code is a compressed quantized version of the first ambient temperature and the second digital code is a compressed quantized version of the second ambient temperature.

19. The method of claim 14, further comprising sending the first broadcast message and the second broadcast message to a local limit management unit to execute local thermal management for the first subsystem location and the second subsystem location.

20. The method of claim 19, wherein the local thermal management is independent of a centralized thermal management system for the SOC and the local limit management unit is configured to accept auxiliary data from the centralized thermal management system for the execution of the local thermal management.

* * * * *